US008465256B2

(12) United States Patent
Holmoy

(10) Patent No.: US 8,465,256 B2
(45) Date of Patent: Jun. 18, 2013

(54) WIND TURBINE ROTOR

(76) Inventor: Vidar Holmoy, Barkaker (NO)

( * ) Notice: Subject to any disclaimer, the term of this patent is extended or adjusted under 35 U.S.C. 154(b) by 864 days.

(21) Appl. No.: 12/529,751

(22) PCT Filed: Feb. 15, 2008

(86) PCT No.: PCT/NO2008/000060
§ 371 (c)(1),
(2), (4) Date: Oct. 27, 2009

(87) PCT Pub. No.: WO2008/111841
PCT Pub. Date: Sep. 18, 2008

(65) Prior Publication Data
US 2010/0086407 A1 Apr. 8, 2010

(30) Foreign Application Priority Data
Mar. 14, 2007 (NO) .................................. 20071370

(51) Int. Cl.
F01D 5/22 (2006.01)
(52) U.S. Cl.
USPC ...................... 416/141; 416/196 R
(58) Field of Classification Search
USPC ............... 416/99, 132 B, 141, 142, 147, 155, 416/194, 196 A, 196 R
See application file for complete search history.

(56) References Cited

U.S. PATENT DOCUMENTS

| 4,213,737 | A | | 7/1980 | Gerhardt | |
|---|---|---|---|---|---|
| 4,735,552 | A | * | 4/1988 | Watson | 416/99 |
| 4,818,181 | A | | 4/1989 | Kodric | |
| 4,822,247 | A | | 4/1989 | Heinz | |
| 5,531,567 | A | | 7/1996 | Hulls | |
| 6,364,609 | B1 | * | 4/2002 | Barnes | 416/142 |
| 2008/0124216 | A1 | * | 5/2008 | Liao | 416/24 |
| 2008/0253892 | A1 | * | 10/2008 | Dehlsen | 416/147 |

FOREIGN PATENT DOCUMENTS

| DE | 3332810 | A1 | 3/1985 |
|---|---|---|---|
| DE | 3413191 | A1 | 10/1985 |
| DE | 3628626 | A1 | 2/1988 |
| DE | 3900839 | A1 | 8/1989 |
| DE | 19606359 | A1 | 8/1997 |
| FR | 2430526 | A1 | 2/1980 |
| GB | 395301 | A | 7/1933 |

OTHER PUBLICATIONS

Burton, et al., "Wind Energy Handbook", 2001, 12 pages, John Wiley & Sons, LTD, West Sussex, England.
Chandler, "Prioritising Wind Energy Research," Jul. 2005, 59 pages, EWEA.
Juul et al., "The Wind Energy Pioneers: The Gedser Wind Turbine," Printed Apr. 6, 2010 from http://guidetour.windpower.org/en/pictures/juul.htm, 2 pages.

* cited by examiner

Primary Examiner — Edward Look
Assistant Examiner — Woody A Lee, Jr.
(74) Attorney, Agent, or Firm — Rothwell, Figg, Ernst & Manbeck PC

(57) ABSTRACT

Wind power plant rotor comprising one or more rotor blades and stiffening elements to stiffen the rotor, where the rotor blades are arranged such that they can turn around their longitudinal axes relative to corresponding rotor stiffening elements. Each rotor blade may comprise at least two rotor blade parts where the outer rotor blade part may be turnably arranged relative to the inner rotor blade part. The solution facilitates use of longer or slimmer rotor blades while strength and stiffness increase. The fatigue forces are thereby reduced while the corresponding tower structure can be made stiffer and lighter. Manufacturing and transport costs are reduced. Further, the stiffening elements may be formed with an aerodynamic outer cross section as for example a drop profile or wing profile in order to reduce air drag and audible noise.

13 Claims, 3 Drawing Sheets

WIND TURBINE ROTOR

CROSS REFERENCE TO RELATED APPLICATION(S)

This application is a 35 U.S.C. §371 National Phase Entry Application from PCT/NO2008/000060, filed Feb. 15, 2008, and designating the United States. This application also claims the benefit of Norwegian Patent Application No. 20071370 filed Mar. 14, 2007, the disclosure of which is incorporated herein in its entirety by reference.

AREA OF THE INVENTION

The invention generally relates to wind power based exploitation of energy. More specifically the invention relates to wind power plant rotor. Concretely the invention relates to a stiffened wind power plant rotor where each rotor blade is turnably arranged around its own length axis relative to rotor stiffening elements.

PRIOR ART

Energy from wind is currently competing with an increasing number of different types of energy sources. It is crucial that wind turbines are built in a simple and good manner, and that they are efficient in operation. The trend of recent years is to build larger turbines. These exploit windy areas much better, and they are partly more cost efficient than smaller models when it comes to manufacturing, installation and operation.

The energy is produced by the rotor blades transferring torsion moments to the rotor shaft. Considerably larger moments on the rotor blades are however deflecting the rotor blades out of the rotor plane in the direction of the wind. The connections to the rotor shaft thereby become large when three large rotor blades are to be fastened.

The request for larger units implies that the rotor blades must become longer and stronger because it gives access to wind energy from a larger circular wind area. The relative velocity U between rotor blade and air is highest at the outermost tip. The corresponding forces are also large. Available energy over the circular area increases with the diameter D×D, while the weight of the materials and the cost for congruent parts are proportional to the diameter D×D×D. Regarding dimensioning fatigue from gravity it can be shown that the weight of the materials should be increased with D to the power of four in order to keep the same strength. From this it may be understood that the rotor blades get relatively thicker, broader, heavier and more expensive. This hinders the development towards larger installations.

Regarding prior art it is generally referred to <<*Wind Energy Handbook*>> by Tony Burton, David Sharpe, Nick Jenkins, Ervin Bossanyi. ISBN 0471489972, John Wiley & Sons Ltd, 2001, West Sussex, England, or <<*Prioritizing Wind Energy Research-Strategic Research Agenda of the Wind Energy Sector*>>-European Wind Energy Association, July 2005, www.ewea.org.

Modern exploitation of wind energy implies almost exclusively use of rotors with 3 rotor blades with radius for the time being of up to 63 meters. These are produced and transported in whole lengths, which evidently constitutes an increasing challenge when the line of business talks about rotor blades of 100 meters in a few years. Large resources have been spent in several countries in order to make the rotor blades efficient and, in addition, strong enough particularly when it comes to fatigue. They must also be sufficiently stiff not to touch the tower structure. A common view in the area today is that a rotor with 3 rotor blades is optimal (ref. "*Wind Energy Handbook*").

When the rotor diameter increases, the same rotation frequency will cause the speed furthest out to surpass 60-70 m/s, and noise problems will arise making the structures unfavourable for placement in the landscape.

Larger land based wind power plant rotors will therefore have lower rotational speed than today, which makes it probable that the efficiency of three bladed rotors will decrease somewhat compared to smaller models; the rotor blades will pass their area at a slower cycle.

Modern large turbines are virtually all constructed with three un-stiffened rotor blades of increasing sizes. Backstays are however not unknown in the area. So-called ring backstays were used in 1957 on the well-known Gedser turbine built by Johannes Juul 1956-57, www/windpower.org/da/pictures/juul.htm. Neither is a rotor shaft extended forward and provided with radial "rotor shaft" backstays backwards towards each rotor blade unknown, for example the same Gedser turbine or traditional 4-bladed mills from the 18$^{th}$ century. The rotor blades were however not turnable to any significant extent.

The German patent DE-19606359-A1 "Rotorhalterung für Windkraftmaschinen unter Verwendung von Stangen oder ähnlichen Halteelementen" by Helmut Maas, 14$^{th}$ August 1997, presents also a form of backstays which stiffens each rotor blade like a mast, with horns of the crosstrees, and symmetrical backstays. This solution reduces the deflection forces in the rotor blade, but is not practical because the backstays closest to the tower are in the way making it very difficult to mount the rotor without it touching the tower. An advantage of the German solution according to DE-19606359-A1 is that the rotor blades may be turned. Deflection forces and fatigue closest to the rotor blade root are however probably even greater than for un-stiffened rotor blades. The backstays give too small advantages also for this solution for the extra disadvantages to be acceptable.

There are more patent texts presenting different variants of backstays like for example U.S. Pat. No. 4,822,247 "Rotor for a wind-driven generator" by Alberto K. Heinz, U.S. Pat. No. 5,531,567 "Vertical axis wind turbine with blade tension" by John R. Hulls, DE-3628626-C2 "Windkraftmachinen-Regelung" by Peter Frieden, DE-3332810-A1 "Vorrichtung zur Ausnützung von in Land—und Seewind enthaltener Energie" by Gunter Wagner, DE-3413191-A1 "Rotor fur Windkraftwerke" by Rolf Maderthoner and DE-3900839-A1 "Windkraftanlage mit einstufiger übersetzung" by Bernd Krieg. None of the abovementioned inventions presents the characterizing features of the present invention.

The list below presents problems with solutions according to prior art:
- Bending forces and deflection of the rotor blades during use causes fatigue and may additionally result in lack of distance to the tower structure.
- Therefore the tower structure normally is designed as a large, conical tube. The material cost and the concept are however unsuitable for large sizes.
- Lack of stiffening causes fatigue stress on the materials which limits the lifetime of blades and tower and more.
- The length of the blades must be limited because the rotor blades get heavy if they are to be sufficiently stiff. This in turn causes earlier fatigue due to the gravitational forces. All this makes large rotor radiuses very expensive and unsuitable compared to the gains which may be achieved.

Turning of the rotor blades around the longitudinal axis is necessary for optimal control of the angle of the rotor blades under normal operation, and for "position of rest" for example by heavy wind. Eventual rotor stiffening elements makes this difficult and these are virtually not in use today.

Long rotor blades are difficult to transport.

The stiffening elements causes increased noise from the wind power plant rotor and restrain rotation because of air drag.

SUMMARY OF THE INVENTION

The invention relates to wind power plant rotor comprising two or more rotor blades and rotor stiffening elements adapted to stiffen the rotor, where the rotor blades are arranged such that they are turnable around their longitudinal axes relative to corresponding rotor stiffening elements. Each rotor blade may comprise at least two rotor blade parts where the outer rotor blade part may be turnably arranged relative to the inner rotor blade part. Usually each blade will be provided with blade stiffening elements which substantially reduce deflections and bending forces in the blades. The solution facilitates use of longer and slimmer rotor blades at the same time as strength and stiffness increase. Thereby fatigue forces are reduced while the corresponding tower structure may be made stiffer and lighter. The manufacturing and transport costs are reduced, and the outer blade part may be made in two separate parts to facilitate easy transport and handling.

Turning of the rotor blades is an important requirement which is relevant by common "pitch control" of rotor blade angle when the wind varies in force. Turning of the rotor blades is also important when halting the rotor, and for reduction of the forces when the wind surpasses approximately 25 m/s. Such halting normally takes place without turning away from the wind direction. It will also be of interest to let the axis of the halted rotor turn up against the wind if this should come from different direction, by traditional net power or alternative accumulated reserve power. Thereby it is guaranteed that a halted rotor is not subjected to unsuitable stress directions.

The number of rotor blades for large plants (radius approximately 50 meters and more) should be 4 to 6. Physical relations imply that these must be slimmer relative to the length in order to function with a high efficiency.

The present invention reduces large dimensions, large masses, large deflections and large lengths, at the same time gaining considerable extra strength in the construction. Thereby it is feasible to build wind power plants which to a large extent surpass previous performance when it comes to both geometric sizes and economical efficiency.

According to the present invention the rotor blades are arranged relatively freely turnable about their longitudinal axes relative to the corresponding rotor stiffening elements. This allows efficient control of rotor blade angle for wind power plant rotor with stiffening elements, which in turn facilitates use of long rotor blades without these being too large or too heavy, and thereby construction of large, cost efficient wind turbines with low noise and operational advantages in the form of long lifetime.

In one embodiment the turnable rotor blades may be in two parts. A tubular connection between the inner and the outer rotor blade elements secures a stiff connection without risk of slip out, which at the same time allows for integration of the connection device for rotor stiffening elements, something that contributes considerably such that the rotor blades can be constructed in two or more parts thereby facilitating easier manufacturing and transport. The tubular connection—the joining element—may be a part of one of the blade parts, or a separate device.

The stiffening elements may be shaped with an aerodynamic outer cross section, as for example a drop- or wing-profile, in order to reduce air drag and audible noise. The shape of the elements may in certain cases cause the elements to contribute positively to the energy production.

Some positive effects of the invention may be summarized as follows:

- A stronger, slimmer and lighter construction. Approximately 30-40% reduction in material and building costs even with an increase in number of rotor blades from 3 to 4. Reduced stress in the rotor blade and in the mounting towards the rotor shaft. Prospects of simple joints which do not have to transfer large bending forces.
- Considerably stiffer rotor blades. This facilitates larger clearing between tower and rotor blade tips and thereby space for designing towers with three or four legs which are stiffer, lighter, taller and more cost efficient than the current mono columns. Remember that the traditional columns give considerable movements ("seaway") in the tower under operation.
- Handling is simplified and manufacturing and transport cost are reduced. The parts are getting shorter, and possibly even more important: the rotor blades are getting slimmer. Transport under bridges and on normal roads is facilitated. Considerably larger turbines may simply be built on land. Economically optimal size increases from 2-3 MW to approximately 12 MW.
- Prospects of building wind turbines with considerably larger rotor radius than today. Considerable positive consequences for the extent of renewable energy.
- Smaller bending forces and thereby easier turning of the rotor blade. Makes pitch control of the rotor blades likely with less powerful equipment. This may possibly take place more rapidly and thereby reduce large forces within rotor blade and rotor.
- Prospects of improved architecture and arrangement of the wind power plants.

BRIEF DESCRIPTION OF THE FIGURES

The following detailed description of embodiments of the invention seen in relationship with the attached drawings, will give a more comprehensive understanding of the invention.

DETAILED DESCRIPTION OF EMBODIMENTS OF THE INVENTION

An embodiment example of a wind power plant rotor with two-piece rotor blades (20, 30) according to the invention is described with reference to the figures.

Figure 1:
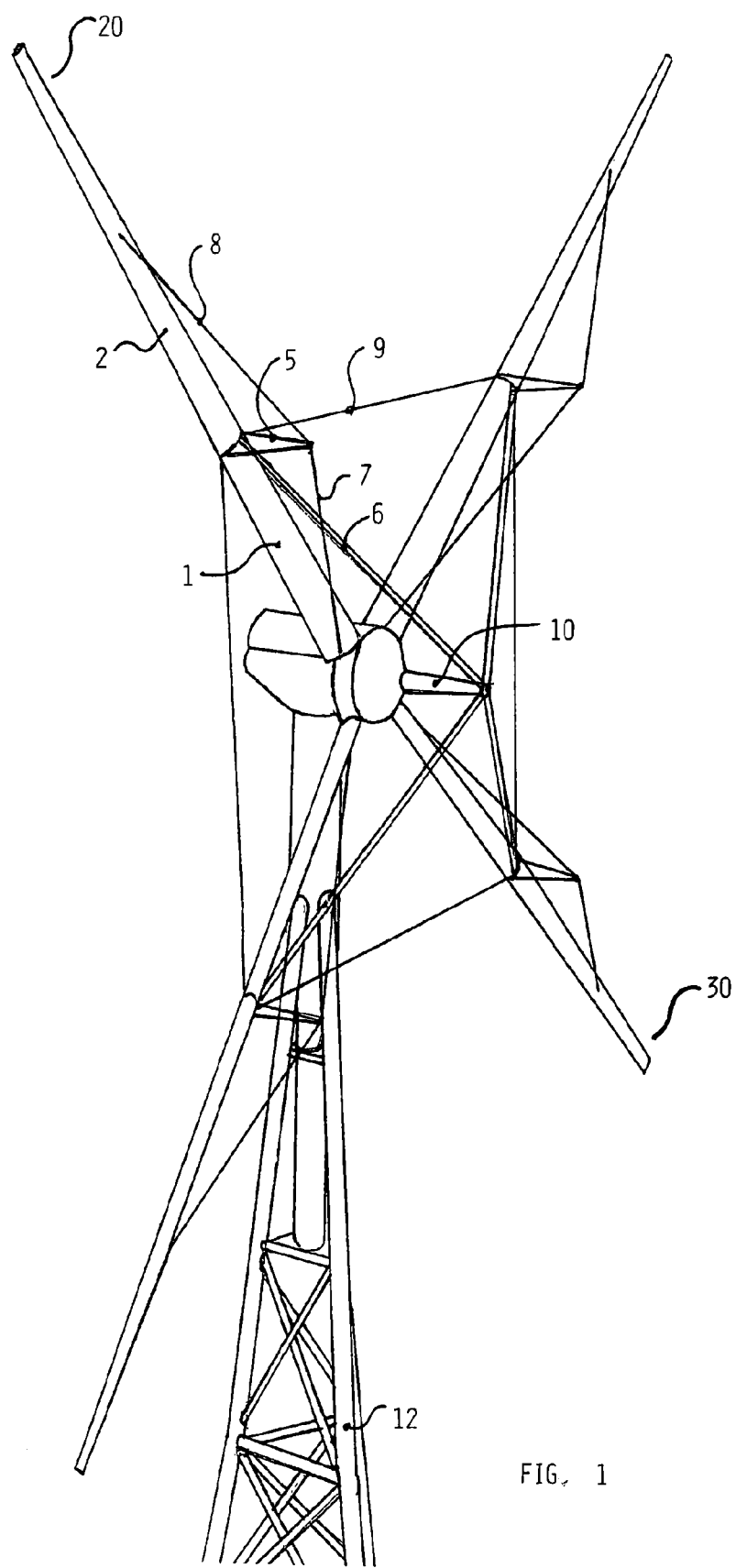
FIG. 1 presents a wind turbine comprising a wind power plant rotor according to one embodiment of the invention.

FIG. 1 presents a wind mill with tower (12) and wind power plant rotor according to the invention. The wind power plant rotor comprises a rotor shaft (10), four rotor blades (20, 30) each of which comprises two rotor blade parts (1, 2), and a number of stiffening elements (5-9) including radial blade stiffening elements (7 and 8) and tangential rotor stiffening elements or ring stiffening (9), and rotor shaft strut.

Figure 2:
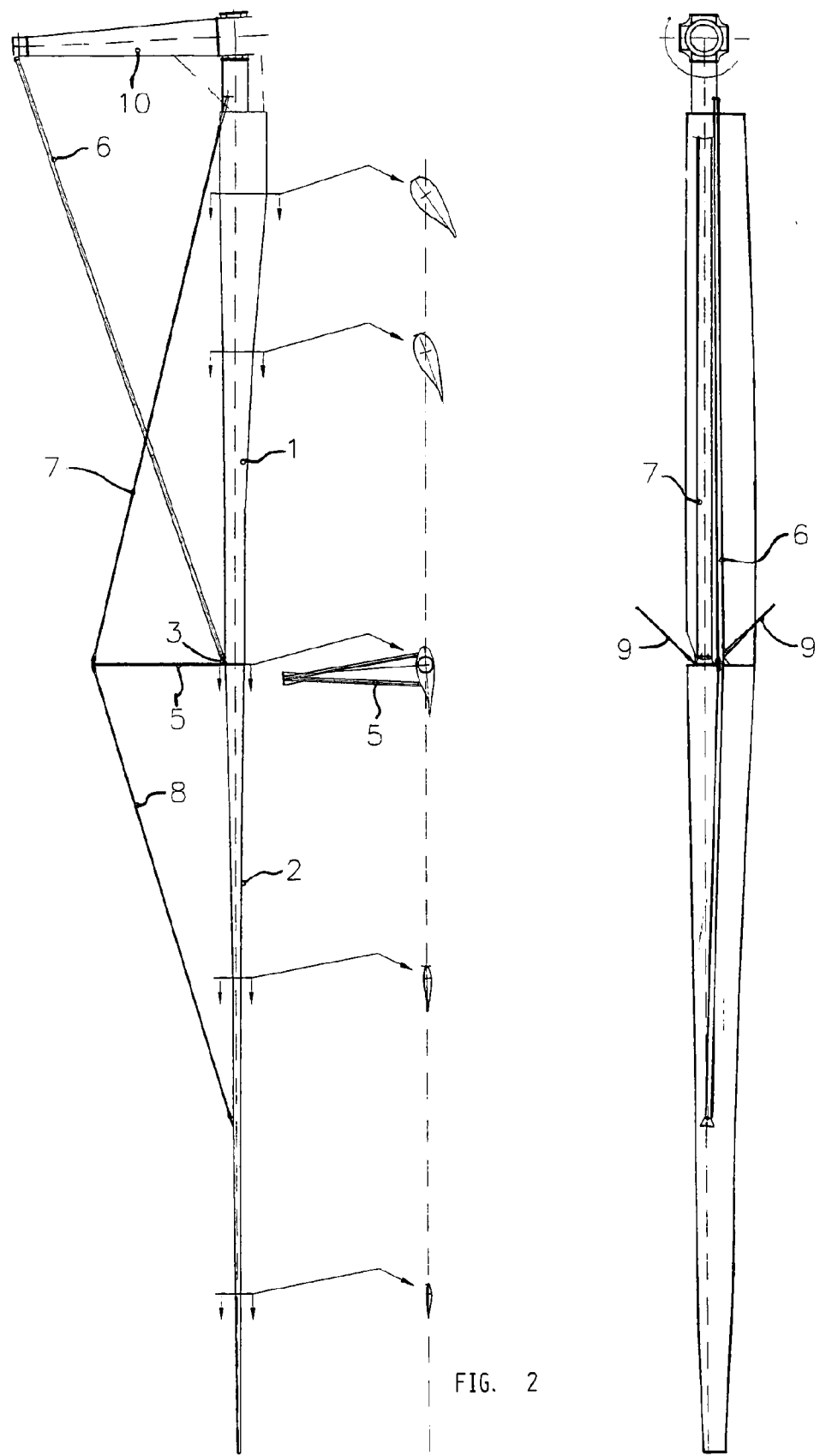
FIG. 2a, 2b present cross sectional view of a rotor blade with corresponding rotor stiffening elements.
Figure 3:
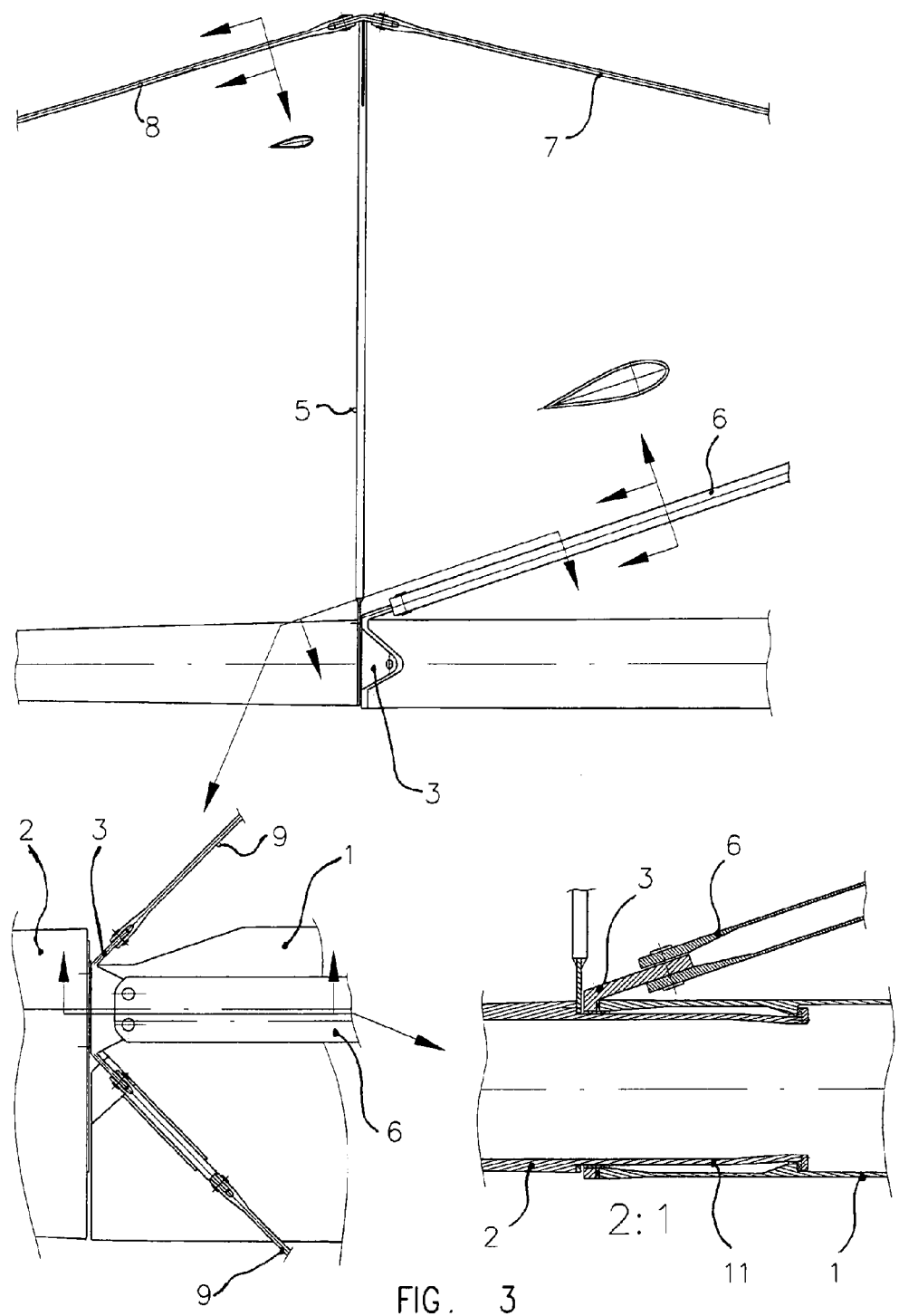
FIG. 3a presents cross sectional view of two-piece rotor blade with corresponding attachment and stiffening elements.
FIG. 3b presents detailed cross sectional view of two-piece rotor blade with corresponding attachment and stiffening elements.
FIG. 3c presents detailed cross sectional view of a two-piece rotor blade with corresponding attachment and stiffening elements.

FIGS. 2 and 3 present a two-piece rotor blade (20, 30) with corresponding joining and stiffening elements. In this embodiment example each rotor blade comprises an inner (1) and an outer rotor blade part (2) divided in two somewhat on the inner side of the middle of the rotor blade. The rotor blade parts (1, 2) are held together by joining elements in the form of a tubular connection (11) which extends from a rotor blade part (2), through casing and into the other rotor blade part (1), where it is locked against slip out by a sufficiently strong connection. Relative turning of approximately +/−10 degrees between the rotor blade parts (1, 2) is controlled by electrical or hydraulic mechanism such as hydraulic cylinder. The complete connection between the tubular connection (11) and the inner rotor blade part (1) is mounted with casings or roller bearings which may be arranged in connection with the connection device (3) or the joining element (11).

A joining device for rotor blade in form of a disk (3) is mounted on the tubular connection (11) such that the rotor blade parts (1 and 2) and the disk (3) may turn relative to each other. Said disk (3) is attached to the rotor shaft strut (6) and the ring stiffening (9). At least the ring stiffening (9) are typically under tension, and together with the rotor shaft strut (6), these will hinder translation and rotation of the disk (3) such that the centre of the rotor blade is fixed.

A structure provides for a spacing element (5) which is attached to the rotor blade part (2) on the outer side of the disk (3) such that the spacing element (5) and the blade stiffening elements (7 and 8) which are set up along most of the rotor blade (1 and 2) towards the top of the spacing element, significantly reduce the bending forces in the middle part of the rotor blade (20, 30). The largest bending forces originate as a consequence of large aerodynamic lifting forces and dynamic effects related to this, and they are picked up by tension in the blade stiffening elements (7 and 8). Relatively small bending forces at the division of the rotor blade (20, 30) are thereby achieved, and this connection thereby gets less comprehensive and complicated.

The stiffening elements (5) to (9) may have an outer cross section of for example drop shape or rotor blade cross section.

The rotor blade part (1) has recesses for the ring stiffening (9), and stiffening elements (7 and 9) may be provided with turnbuckles or other fastening devices such that mounting and adjustments of the whole rotor to be practically feasible.

It may be shown that the extra backstays/struts only have insignificant negative influence on the ability of the rotor to collect energy, particularly if they are given an oval shape or the shape of a wing, which reduce drag forces.

The rotor blades (1, 2) may be pre-stressed such that elements are kept in tension. These may be named backstays. The turbine may also automatically be turned up against the wind such that the largest wind loads come purely from the front or from the side. This facilitates documentation of sufficient strength in all probable load situations.

The invention presumes a normal control system for rotor blades and turbine with sensors, data acquisition and logic adapted to the features of the construction. The invention allows for each rotor blade to be turned individually without being hindered by the rotor blades themselves or other elements. Such turning may be performed as it is known within the area, by hydraulic or electric mechanisms. The rotor blades may have features in common with already existing constructions, for example so-called pitch control such that loads and oscillations in the turbine are reduced. There is also room for the inner and the outer parts of the rotor blades (1, 2) to be independently turned. This opens for new and faster pitch control of rotor blades by letting the outer part being responsible for the fine tuning of the angles while the inner part turns on the way to or from halted position.

The tangential elements (9) which are also referred to as the ring stiffening, limit the cyclic loads for each revolution such that the resistance towards fatigue caused by the gravity forces is considerably improved.

Traditional materials like fibre glass reinforced epoxy, bronze casings, steel rope and steel materials may be used as a starting point. For particular parts such as stiffening elements or casings, more exotic materials might be considered used in order to reduce weight or increase the lifetime. For example the outer part of the rotor shaft might be built in glass fibre reinforced epoxy.

A slow rotor speed of the rotor may provide a soothing visual effect for spectators. When the slow-rotating rotor includes 4-6 rotor blades, the invention may give completely different visual experiences than conventional wind power rotors.

The invention claimed is:

1. Wind power plant rotor comprising
   a rotor shaft;
   two or more rotor blades attached to said rotor shaft, wherein each rotor blade is comprised of a first radially inward portion and a second radially outward portion;
   rotor stiffening elements to stiffen the wind power plant rotor;
   connection devices connecting the rotor stiffening elements with each other and the rotor blades; and
   blade stiffening elements and a corresponding spacing element associated with each rotor blade and configured to stiffen the associated rotor blade against bending deflections;
   wherein the rotor stiffening elements and blade stiffening elements are configured to permit rotation of the rotor blades around their longitudinal axes relative to the rotor stiffening elements.
   wherein said spacing element extends from the associated rotor blade, at a radial location between said first and second portions, and said blade stiffening elements comprise:
   a first radial blade stiffening element extending from said first portion of the associated rotor blade, to a portion of the spacing element spaced apart from the associated rotor blade; and
   a second radial blade stiffening element extending from a second portion of the associated rotor blade to a portion of the spacing element spaced apart from the associated rotor blade.

2. Wind power plant rotor according to claim 1, where the rotor stiffening elements comprise rotor shaft struts and/or ring stiffening.

3. Wind power plant rotor according to claim 1, where each rotor blade comprises at least two rotor blade parts with corresponding joining elements.

4. Wind power plant rotor according to claim 3, where the joining elements between the rotor blade parts comprise casings or roller bearings.

5. Wind power plant rotor according to claim 3, where an outer rotor blade part is arranged such that it can turn around its longitudinal axis relative to the corresponding inner rotor blade part.

6. Wind power plant rotor according to claim 5, where the turning of the outer rotor blade part is provided for by a turning mechanism arranged close to the connection between the rotor blade parts.

7. Wind power plant rotor according to claim 6, where the turning mechanism is constituted by an electrically or hydraulically driven mechanism.

8. Wind power plant rotor according to claim 3, where said at least two rotor blade parts are connected by a joining element comprising a tubular connection extending from the one rotor blade part and into the other rotor blade part, where the tubular connection is locked against slip out.

9. Wind power plant rotor according to claim 1, where the connection devices comprise a disk or pipe shaped element which is arranged for lead-through of an adapted part of the corresponding rotor blade, and where said disk or pipe shaped element comprises attachment devices for adjoining rotor stiffening elements.

10. Wind power plant rotor according to claim 1, where the connection devices comprise casings or roller bearings.

11. Wind power plant rotor according to claim 1, comprising one or more stiffening elements which are formed with an aerodynamic outer cross section as for example a drop or wing profile, in order to reduce air drag and audible noise.

12. Wind power plant rotor according to claim 1, where one or more of the stiffening elements are provided with turnbuckles to secure efficient stiffening of the rotor by applying suitable tensioning force to said stiffening elements.

13. Wind power plant rotor according to claim 1, wherein said rotor stiffening elements comprise: a rotor shaft strut extending from the rotor shaft to each of the rotor blades; and ring stiffening elements extending between each pair of adjacently disposed rotor blades.

* * * * *